(12) United States Patent
Luebke et al.

(10) Patent No.: US 7,205,892 B2
(45) Date of Patent: Apr. 17, 2007

(54) HOME SYSTEM EMPLOYING A CONFIGURABLE CONTROL ACTION AND METHOD OF CONFIGURING A HOME SYSTEM FOR CONTROL

(75) Inventors: Charles J. Luebke, Sussex, WI (US); Michael L. McManus, Oakdale, PA (US)

(73) Assignee: Eaton Corporation, Cleveland, OH (US)

( * ) Notice: Subject to any disclaimer, the term of this patent is extended or adjusted under 35 U.S.C. 154(b) by 230 days.

(21) Appl. No.: 11/002,757

(22) Filed: Dec. 2, 2004

(65) Prior Publication Data

US 2006/0125632 A1 Jun. 15, 2006

(51) Int. Cl.
*G08B 1/08* (2006.01)

(52) U.S. Cl. ............... 340/539.26; 340/539.1; 340/506; 340/3.1

(58) Field of Classification Search .......... 340/506, 340/539.1, 539.26, 3.1
See application file for complete search history.

(56) References Cited

U.S. PATENT DOCUMENTS

| | | | |
|---|---|---|---|
| 5,240,022 A | 8/1993 | Franklin | |
| 5,400,246 A * | 3/1995 | Wilson et al. | 700/17 |
| 5,655,561 A | 8/1997 | Wendel et al. | |
| 5,907,279 A | 5/1999 | Bruins et al. | |
| 6,025,788 A | 2/2000 | Diduck | |
| 6,662,821 B2 | 12/2003 | Jacobsen et al. | |
| 2003/0197617 A1 | 10/2003 | Berger et al. | |

* cited by examiner

*Primary Examiner*—Daryl C Pope
(74) *Attorney, Agent, or Firm*—Martin J. Moran (57) ABSTRACT

A home system includes a server having a first wireless communication port and a user interface. A plurality of sensors sense information and include a second wireless communication port, which sends the sensed information to the first wireless communication port of the server. A plurality of control devices output a control action and include a third wireless communication port, which receives the control action from the first wireless communication port of the server. The user interface of the server is adapted to configure the devices to output the control action responsive to: (a) at least one input from the sensors, (b) another input from one of the sensors or the user interface, and (c) a logic function applied to the at least one input from the sensors and to the another input from one of the sensors or the user interface.

26 Claims, 9 Drawing Sheets

HOME SYSTEM EMPLOYING A CONFIGURABLE CONTROL ACTION AND METHOD OF CONFIGURING A HOME SYSTEM FOR CONTROL

CROSS-REFERENCE TO RELATED APPLICATIONS

This application is related to commonly assigned:

U.S. patent application Ser. No. 10/686,016, filed Oct. 15, 2003, entitled "Home System Including A Portable Fob Mating With System Components";

U.S. patent application Ser. No. 10/686,179, filed Oct. 15, 2003, entitled "Home System Including A Portable Fob Having A Rotary Menu And A Display";

U.S. patent application Ser. No. 10/686,187, filed Oct. 15, 2003, entitled "Home System Including A Portable Fob Having A Display";

U.S. patent application Ser. No. 10/852,405, filed May 24, 2004, entitled "Home System And Method For Sending And Displaying Digital Images"; and U.S. patent application Ser. No. 10/853,664, filed May 25, 2004, entitled "Portable Timer Apparatus, Home System And Method Of Timing For An Object".

BACKGROUND OF THE INVENTION

1. Field of the Invention

This invention relates generally to home systems and, more particularly, to home systems employing sensors, control devices and communications, such as, for example, a wireless local area network (WLAN) or a low rate—wireless personal area network (LR-WPAN). The invention also relates to methods for configuring control aspects of a home system.

2. Background Information

Wireless communication networks are an emerging new technology, which allows users to access information and services electronically, regardless of their geographic position.

Home (e.g., residential; house; apartment) monitoring, security, and automation (control) systems are well known.

A common type of stand-alone sensor for the home is the conventional smoke detector, which typically employs an audible signal for alarming and a blinking light (e.g., a LED) as a normal condition monitor. A family of such stand-alone sensors exists including, for example, audible door alarms.

Relatively low power, radio frequency (RF) lighting control systems employ wall-mounted, battery powered, RF switch "sensors". Such a sensor sends a signal to a remote power control device, such as relay, in order to turn one or more house lights on and off.

Unlike stand-alone devices, a low power, RF sensor device allows its sensor to be connected to a remote controller or monitor. A simple example of this is the automatic garage door opener. In this example, the "sensor" is a button in a car. When the button is pushed, this causes the garage door to open or close.

A known mechanism for associating a particular sensor with a given controller may involve pushing a button on the sensor while also pushing a button on the controller. This process usually requires two people.

It is known to provide a sensor system in which a plurality of sensors are connected, either directly with wires or indirectly with RF communications, to a central control and monitoring device. An example of such a sensor system is a security system, which may include a telephone line for dial out/in communication.

U.S. Pat. No. 5,240,022 discloses an automatic shut-off valve system for installation, for instance, in the water supply line to a hot water heater and includes a sensor to detect leakage electrically by sensing moisture, and then shutting off the supply line in response.

U.S. Pat. No. 6,025,788 discloses a liquid or gas detection and control apparatus comprising: (a) a liquid or gas detector (sensor) for detecting liquid or gas; (b) a transmitter for an output signal from the liquid or gas detector, the transmitter, when activated by the liquid or gas detector detecting liquid or gas, transmitting radio signals to a receiver; (c) a receiver and control for receiving and acting on radio signals transmitted by the transmitter; (d) a control mechanism associated with the receiver and control, when commanded by the receiver and control, activating a shut off a valve which controls a source of the liquid or gas; and (e) a power supply for electrically powering the detector, transmitter, receiver and control mechanism. Additionally, a network including a central control electronically communicates with the liquid or gas detectors, transmitters and receivers and controls valves that regulate the sources of liquid or gas. The liquid or gas detectors are remote from the central control and the control valves are independently remotely actuable between open and closed positions in response to the communication from the central control.

There is room for improvement in home systems providing control actions, and in methods for controlling aspects of a home system.

SUMMARY OF THE INVENTION

These needs and others are met by the present invention, which provides a server user interface to configure at least one device to output a control action responsive to: (a) at least one input from at least one sensor, (b) another input from one of the at least one sensor or the user interface, and (c) a logic function applied to the at least one input from the at least one sensor and to the another input from one of the at least one sensor or the user interface.

In accordance with one aspect of the invention, a home system comprises: a server including a first wireless communication port and a user interface; at least one sensor, each of the at least one sensor sensing information and including a second wireless communication port, which sends the sensed information to the first wireless communication port of the server; and at least one device, each of the at least one device outputting a control action and including a third wireless communication port, which receives the control action from the first wireless communication port of the server, wherein the user interface of the server is adapted to configure the at least one device to output the control action responsive to: (a) at least one input from the at least one sensor, (b) another input from one of the at least one sensor or the user interface, and (c) a logic function applied to the at least one input from the at least one sensor and to the another input from one of the at least one sensor or the user interface.

The logic function may be a predetermined logic function. The predetermined logic function may not be user configurable through the user interface.

The predetermined logic function may be user configurable through the user interface.

The predetermined logic function may be selected from the group consisting of an OR logic function, an AND logic function, and an XOR logic function.

As another aspect of the invention, a method of configuring a home system for a control action comprises: sensing information by at least one sensor; wirelessly sending the sensed information from the at least one sensor to a node; determining a control action at the node; outputting the control action; and configuring the control action to be responsive to: (a) at least one input from the at least one sensor, (b) another input from one of the at least one sensor or a user interface, and (c) a logic function applied to the at least one input from the at least one sensor, and to the another input from one of the at least one sensor or the user interface.

The method may employ as the node a server including the user interface; determine the control action at the server; wirelessly send the control action from the server to at least one device; and output the control action from the at least one device.

The method may further comprise employing as the at least one sensor a plurality of sensors; wirelessly inputting a plurality of inputs from at least some of the sensors; and employing the user interface of the server to configure the at least one device to output the control action responsive to the plurality of inputs from at least some of the sensors.

The method may further comprise employing as the at least one sensor a plurality of sensors; wirelessly inputting a plurality of inputs from at least some of the sensors; and employing the user interface of the server to configure the at least one device to output the control action responsive to the plurality of inputs from at least some of the sensors and from another input from the user interface.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As employed herein, the term "wireless" shall expressly include, but not be limited by, radio frequency (RF), infrared, wireless area networks, IEEE 802.11 (e.g., 802.11a; 802.11b; 802.11g), IEEE 802.15 (e.g., 802.15.1; 802.15.3, 802.15.4), other wireless communication standards, DECT, PWT, pager, PCS, Wi-Fi, Bluetooth™, and cellular.

As employed herein, the term "communication network" shall expressly include, but not be limited by, any local area network (LAN), wide area network (WAN), intranet, extranet, global communication network, the Internet, and/or wireless communication network.

As employed herein, the term "portable wireless communicating device" shall expressly include, but not be limited by, any portable communicating device having a wireless communication port (e.g., a portable wireless device; a portable personal computer (PC); a Personal Digital Assistant (PDA); a data phone).

As employed herein, the term "fob" shall expressly include, but not be limited by, a portable wireless communicating device; a wireless network device; an object that is directly or indirectly carried by a person; an object that is worn by a person; an object that is placed on or coupled to a household object (e.g., a refrigerator; a table); an object that is coupled to or carried by a personal object (e.g., a purse; a wallet; a credit card case); a portable object; and/or a handheld object.

As employed herein, the term "user input device" shall expressly include, but not be limited by, any suitable input mechanism or transducer, which collects user input through direct physical manipulation, with or without employing any moving part(s), and which converts such input, either directly or indirectly through an associated processor and/or converter, into a corresponding digital form.

As employed herein, the term "user interface" shall expressly include, but not be limited by, a fob; and/or a user input and output device or interface.

As employed herein, the term "network coordinator" (NC) shall expressly include, but not be limited by, any communicating device, which operates as the coordinator for devices wanting to join a communication network and/or as a central controller in a wireless communication network.

As employed herein, the term "network device" (ND) shall expressly include, but not be limited by, any communicating device (e.g., a portable wireless communicating device; a fob; a camera/sensor device; a wireless camera; a control device; and/or a fixed wireless communicating device, such as, for example, switch sensors, motion sensors or temperature sensors as employed in a wirelessly enabled sensor network), which participates in a wireless communication network, and which is not a network coordinator.

As employed herein, the term "node" includes NDs and NCs.

As employed herein, the term "headless" means without any user input device and without any display device.

As employed herein, the term "server" shall expressly include, but not be limited by, a "headless" base station; and/or a network coordinator.

As employed herein, the term "residence" shall expressly include, but not be limited by, a home, apartment, dwelling, office and/or place where a person or persons reside(s) and/or work(s).

As employed herein, the term "home system" shall expressly include, but not be limited by, a system for a home or other type of residence.

As employed herein, a home wellness system shall expressly include, but not be limited by, a home system for monitoring and/or configuring and/or controlling aspects of a home or other type of residence.

Figure 1:
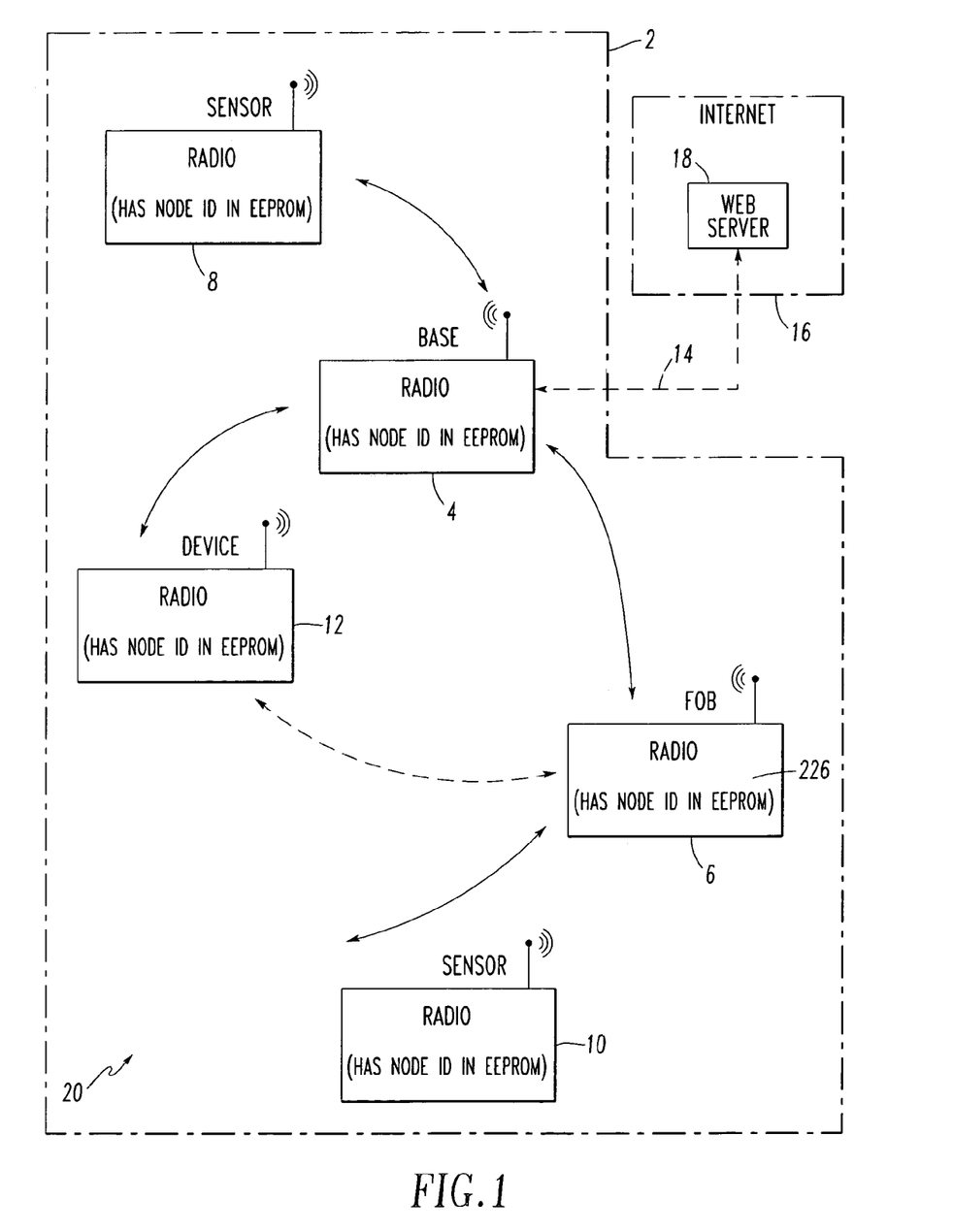
FIG. 1 is a block diagram of a home wellness system in accordance with the present invention.

FIG. 1 is a block diagram of a wireless home wellness system 2. The system 2 includes a "headless" RF base station 4, a portable RF fob or "house key" 6, a plurality of RF sensors, such as 8,10, and one or more output devices, such as 12 (only one device 12 is shown in FIG. 1). The RF base station 4 may include a suitable link 14 (e.g., telephone; DSL; Ethernet) to the Internet 16 and, thus, to a web server 18. The sensors 8,10 may include, for example, the analog sensor 8 and the on/off digital detector 10. The device 12 may include, for example, a water valve and/or a wide range of output devices as set forth, for example, and without limitation, in Example 15, below. The sensors 8,10, device 12, base station 4 and fob 6 all employ relatively short distance, relatively very low power, RF communications. These components 4,6,8,10,12 form a wireless network 20 in which the node ID for each of such components is unique and preferably is stored in a suitable non-volatile memory, such as EEPROM, on each such component.

The base station 4 (e.g., a wireless web server; a network coordinator) may collect data from the sensors 8,10 and "page," or otherwise send an RF alert message to, the fob 6 in the event that a critical status changes at one or more of such sensors.

The fob 6 may be employed as both a portable in-home monitor for the various sensors 8,10 and device 12, also, as a portable configuration tool for the base station 4 and such sensors and such device, and, further, as a remote control for such device.

The example base station 4 is headless and includes no user interface. Alternatively, the invention is applicable to servers, such as base stations, having a local or remote user interface. The sensors 8,10 preferably include no user interface, although some sensors may have a status indicator (e.g., an LED (not shown)). The user interface functions are provided by the fob 6 as will be discussed in greater detail, below. As shown with the device 12, the network 20 preferably employs an adhoc, multihop capability, in which the sensors 8,10, the device 12 and the fob 6 do not have to be within range of the base station 4, in order to communicate.

Figure 2A:
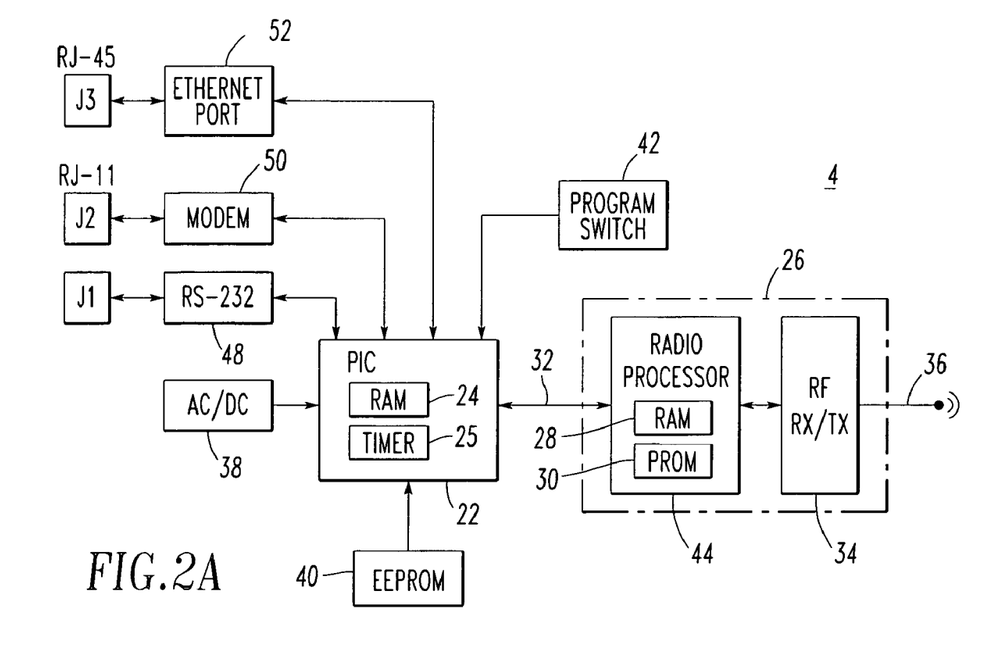
FIG. 2A is a block diagram of the base station of FIG. 1.

FIG. 2A shows the base station 4 of FIG. 1. The base station 4 includes a suitable first processor 22 (e.g., PIC® model 18F2320, marketed by Microchip Technology Inc. of Chandler, Ariz.), having RAM memory 24 and a suitable second radio or RF processor 26 having RAM 28 and PROM 30 memory. The first and second processors 22,26 communicate through a suitable serial interface (e.g., SCI; SPI) 32. The second processor 26, in turn, employs an RF transceiver (RX/TX) 34 having an external antenna 36. As shown with the processor 22, the various base station components receive power from a suitable AC/DC power supply 38. The first processor 22 receives inputs from a timer 25 and a program switch 42 (e.g., which detects mating or engagement with the fob 6 of FIG. 1). The EEPROM memory 40 is employed to store the unique ID of the base station 4 as well as other nonvolatile information such as, for example, the unique IDs of other components, which are part of the wireless network 20, and other configuration related information. The second processor 26 may be, for example, a CC1010 RF Transceiver marketed by Chipcon AS of Oslo, Norway. The processor 26 incorporates a suitable microcontroller core 44, the relatively very low-power RF transceiver 34, and hardware DES encryption/decryption (not shown).

Figure 2B:
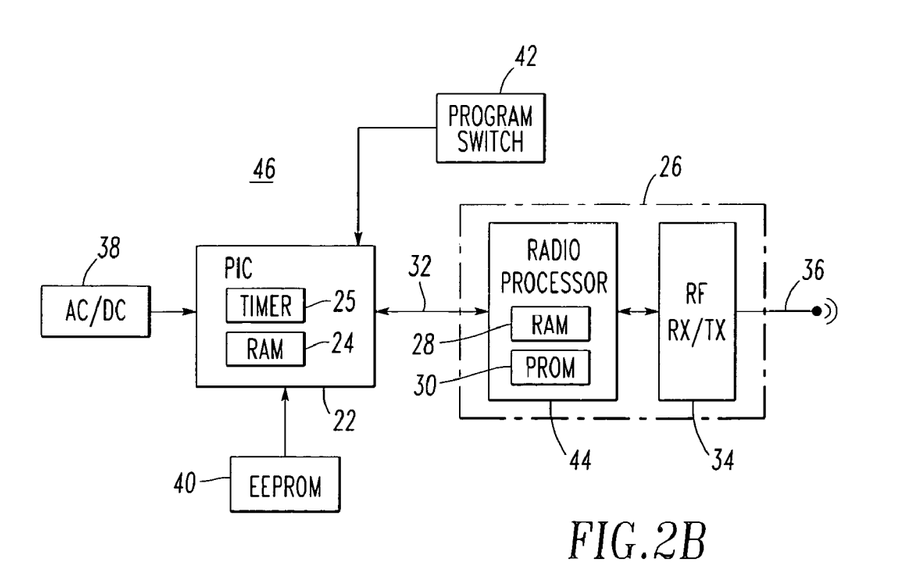
FIG. 2B is a block diagram of a base station in accordance with another embodiment of the invention.

FIG. 2B is a block diagram of another base station 46. The base station 4 of FIG. 2A is similar to the base station 46 of FIG. 2B, except that it also includes one or more interfaces 48,50,52 to a personal computer (PC) (not shown), a telephone line (not shown) and a network, such as an Ethernet local area network (LAN) (not shown). In this example, the PIC processor 22 communicates with a local PC through a suitable RS-232 interface 48 and connector J1, with a telephone line through a suitable modem 50 and connector J2, and with an Ethernet LAN through an Ethernet port 52 and connector J3. Hence, the modem 50 may facilitate communications with a remote cellular telephone, other portable electronic device (e.g., a PDA (not shown)) or a remote service provider (not shown), and the Ethernet port 52 may provide communications with the Internet 16 of FIG. 1 and, thus, with a remote PC or other client device (not shown).

Figure 3:
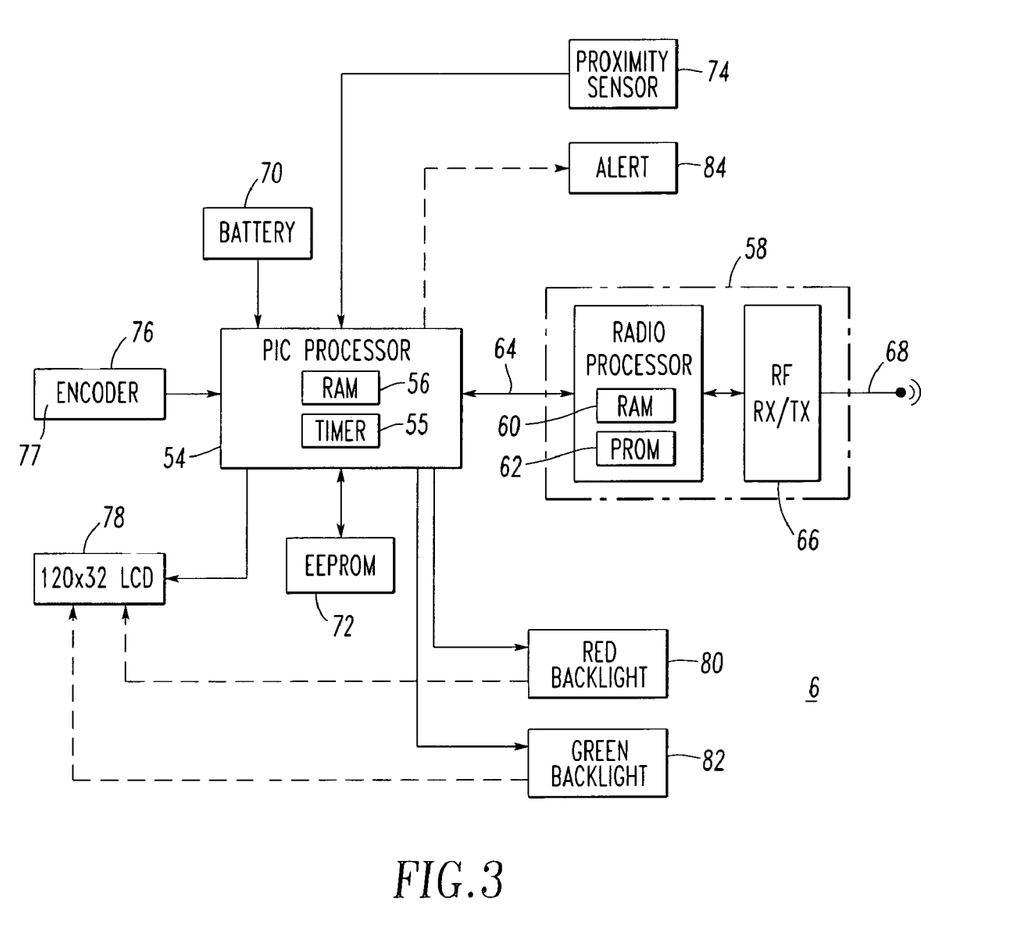
FIG. 3 is a block diagram of the fob of FIG. 1.

FIG. 3 is a block diagram of the fob 6 of FIG. 1. The fob 6 includes a suitable first processor 54 (e.g., PIC) having RAM memory 56 and a suitable second radio or RF processor 58 having RAM 60 and PROM 62 memory. The first and second processors 54,58 communicate through suitable serial interface (e.g., SCI; SPI) 64. The EEPROM memory 72 is employed to store the unique ID of the fob 6 as well as other nonvolatile information. For example, there may be a nonvolatile storage for icons, character/font sets and sensor labels (e.g., the base station 4 sends a message indicating that an on/off sensor or device is ready to configure, and the fob 6 looks up the on/off sensor or device and finds a predefined list of names to choose from). This expedites a relatively rapid interaction. The fob 6 may also employ a short term memory cache (not shown) that is used when the fob 6 is out of range of the base station 4. This stores the list of known sensors and devices and their last two states. This permits the user, even if away, to review, for example, what door was open or what valve was closed, when the fob 6 was last in range.

The second processor 58, in turn, employs an RF transceiver (RX/TX) 66 having an external antenna 68. As shown with the processor 54, the various components of the fob 6 receive power from a battery 70. The first processor 54 receives inputs from a timer 55, a suitable proximity sensor, such as a sensor/base/device program switch 74 (e.g., which detects mating or engagement with one of the sensors 8,10 or with the device 12 or with the base station 4 of FIG. 1), and a user input device, such as, for example, the exemplary encoder 76 or rotary selector/switch, such as a thumbwheel encoder. Typically, such encoder 76 also includes a button 77, through which the user presses, clicks and/or double-clicks to initiate actions through the fob user interface. The first processor 54 also sends outputs to a suitable display 78 (e.g., a 120×32 LCD), one or more visual alerts, such as a red backlight 80 (e.g., an alert is present) and a green backlight 82 (e.g., no alert is present) for the display 78, and an alert device 84 (e.g., a suitable audible, visual or vibrating device providing, for example, a sound, tone, buzzer, vibration or flashing light).

The program switch 74 may be, for example, an ESE-24MH1T Panasonic® two-pole detector switch or a Panasonic® EVQ-11U04M one-pole micro-switch. This program switch 74 includes an external pivotable or linear actuator (not shown), which may be toggled in one of two directions (e.g., pivoted clockwise and counter-clockwise; in and out), in order to close one of one or two normally open contacts (not shown). Such a two-pole detector is advantageous in applications in which the fob 6 is swiped to engage the sensors 8,10, the device 12 or the base station 4, such as is discussed below in connection with FIGS. 6A–6B. Hence, by monitoring one of those contacts, when the fob 6 is swiped in one linear direction (e.g., without limitation, right to left, or left to right), the corresponding contact is momentarily closed, without concern for overtravel of the corresponding engagement surface (not shown). Similarly, by monitoring the other of those contacts, when the fob 6 is swiped in the other linear direction (e.g., without limitation, left to right, or right to left), the corresponding contact is momentarily closed and another suitable action (e.g., a diagnostic function; a suitable action in response to removal of the fob 6; a removal of a component from the network 20; an indication to enter a different configuration or run mode) may be undertaken.

Although a physical switch 74 is disclosed, an "optical" switch (not shown) may be employed, which is activated when the fob 6, or portion thereof, "breaks" an optical beam when mating with another system component. Alternatively, any suitable device or sensor may be employed to detect that the fob 6 has engaged or is suitably proximate to another system component, such as the base station 4 or sensors 8,10 or device 12 of FIG. 1.

The encoder 76 may be, for example, an AEC11BR series encoder marketed by CUI Inc. of Beaverton, Oreg. Although the encoder 76 is shown, any suitable user input device (e.g., a combined rotary switch and pushbutton; touch pad; joystick button) may be employed. Although the alert device 84 is shown, any suitable annunciator (e.g., an audible generator to generate one or more audible tones to alert the user of one or more corresponding status changes; a vibrational generator to alert the user by sense of feel; a visual indicator, such as, for example, an LED indicator to alert the user of a corresponding status change) may be employed. The display 78 preferably provides both streaming alerts to the user as well as optional information messages.

Figure 4:
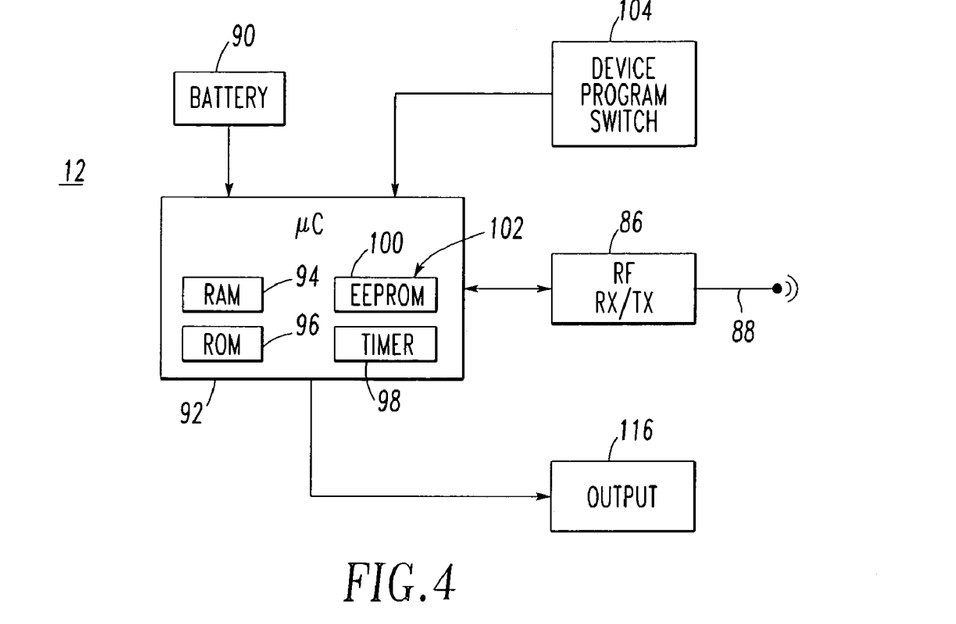
FIG. 4 is a block diagram of the control device of FIG. 1.
Figure 5:
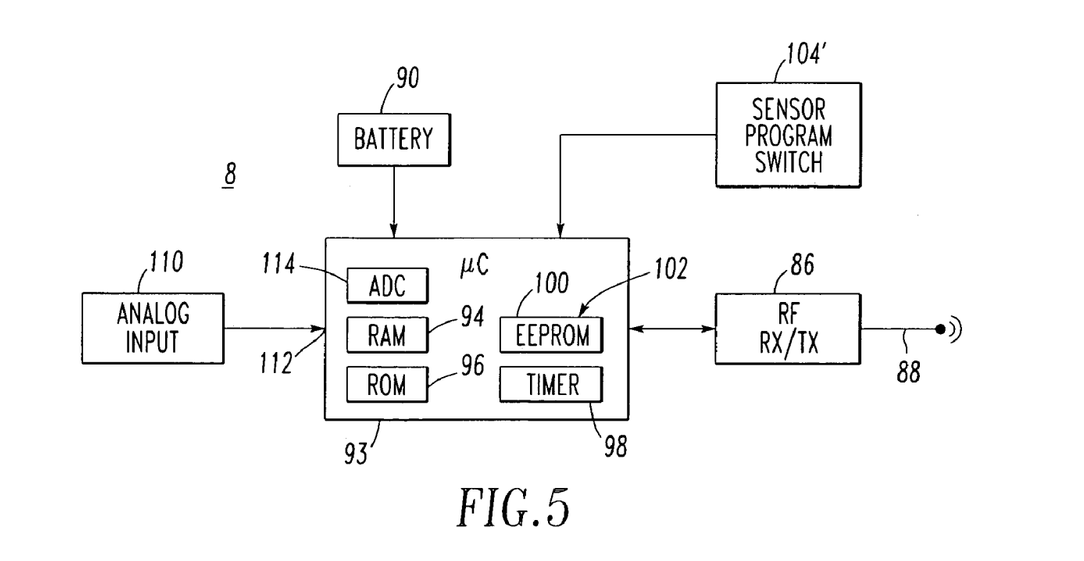
FIG. 5 is a block diagram of one of the sensors of FIG. 1.

FIGS. 4 and 5 are block diagrams of the device 12 and the analog sensor 8, respectively, of FIG. 1. Each of the device 12 and the sensor 8 includes an RF transceiver (RF RX/TX) 86 having an external antenna 88, a battery 90 for powering the various sensor components, a suitable processor, such as a microcontroller (μC) 92 or 93 having RAM 94, ROM 96, a timer 98 (e.g., in order to provide, for example, a periodic wake-up of the corresponding μC 92 or 93, in order to periodically send device or sensor status information back to the base station 4 of FIG. 1) and other memory (e.g., EEPROM 100 including the unique ID 102 of the component which is stored therein during manufacturing), and a device or sensor program switch 104,104' for mating with the fob program switch 74 of FIG. 3.

The device 12 of FIG. 4 includes a suitable control output 116 (e.g., adapted to open and/or close a water valve). Alternatively, the device 12 may be powered from a suitable AC/DC power source (not shown).

The analog sensor 8 of FIG. 5 includes a physical analog input interface 110 (e.g., a water detector) with the μC 93 employing an analog input 112 and a corresponding analog-to-digital converter (ADC) 114.

The device 12 of FIG. 4 and the sensor 8 of FIG. 5 do not include an indicator. It will be appreciated, however, that one or both of such device and sensor may employ an indicator (e.g., to show that a battery 90 is OK; to show that the analog value from the ADC 114 is within an acceptable range of values; to show an on/off input or output state).

Figure 6A:
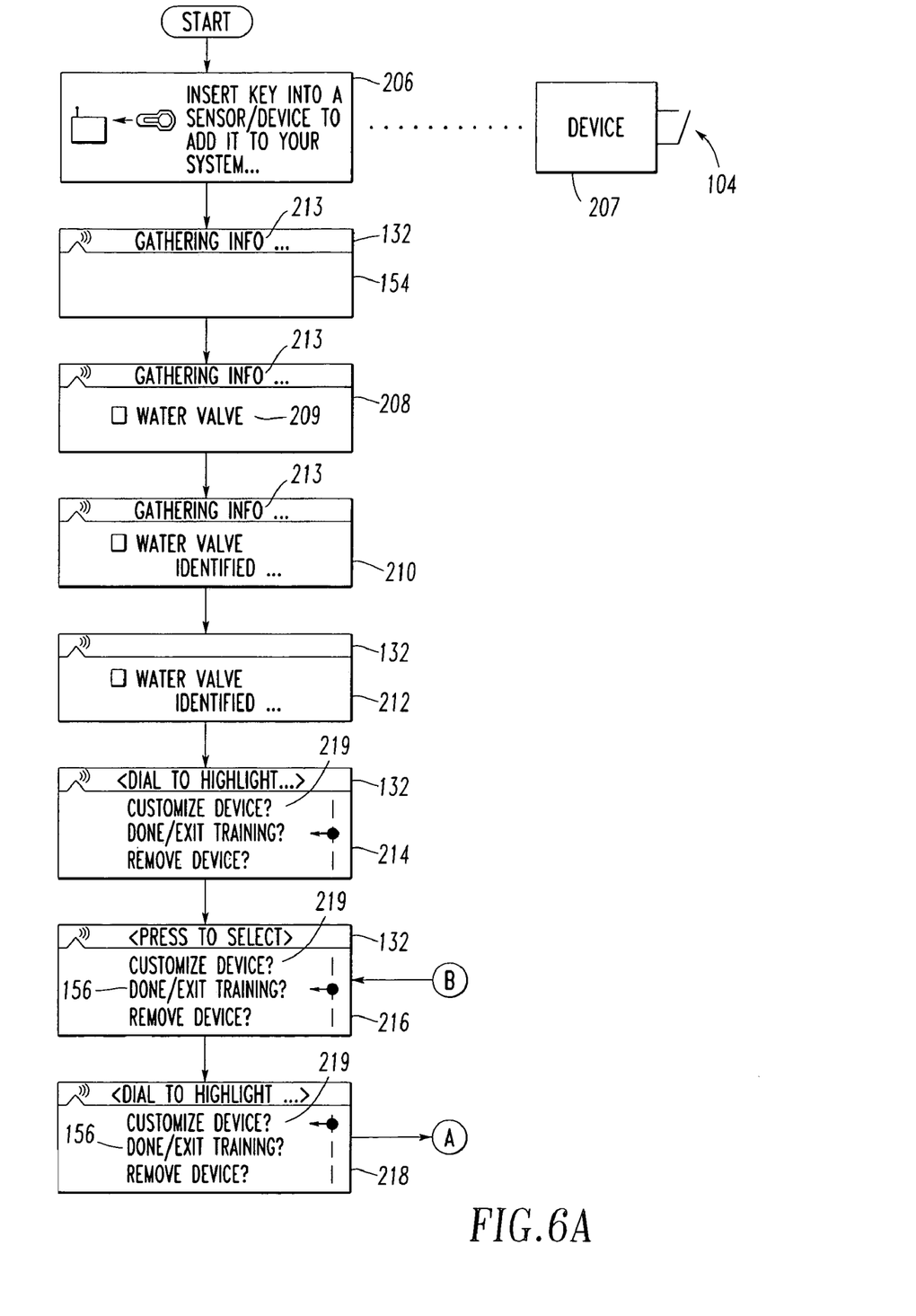
FIGS. 6A and 6B are examples of display sequences used by the fob for configuring the control device of FIG. 1.

FIG. 6A shows sequences of displays employed by the fob 6 for configuring the device 12 of FIG. 1. It will be appreciated that other suitable sequences of displays are employed by the fob 6 to configure the sensors 8,10 or the fob 6 of FIG. 1.

At screen 206 of FIG. 6A, the user is instructed to insert the fob 6 into a device (e.g., a non-configured device 207) in order to add it to the system 2 of FIG. 1. In summary, when one of the sensors 8,10, the device 12 or the base station 4 is keyed in this manner, the fob 6 begins gathering corresponding information and, then, reports the success to the user. As discussed below, the fob 6 provides the ability to customize the device 207, with the status bar 132 cycling through two messages "<dial to highlight . . . >" and "press to select>". Following the screen 206, the screen 154 reports that the fob 6 is gathering information, at 213. This is possible, because there are two, and only two, components in the system 2 (e.g., the fob 6 and the particular device 207 or the base station 4 or one of the sensors 8,10), which are mated and which have their corresponding switches 74 (FIG. 3) and 104 closed at any one time.

When the device switch 104 is activated by mating with the fob 6, the device 207 sends a request (not shown) to the base station 4 to join the network 20 (attempt_network_discovery) of FIG. 1. The fob program switch 74 is also activated (e.g., simultaneously) by mating with the device 207, and the fob 6 also sends a "program sensor" message (not shown) to the base station 4. By receiving this "confirmation" message from the fob 6, the base station 4 knows to accept this device 207 to the network 20, and sends a nwk_connect_confirm message (not shown). Next, screen 208 reports the type of device (e.g., a Water Valve in this example). Then, screen 210 reports that the device 207 is identified and screen 212 removes the "<gathering info . . . >" message 213 from the status bar 132.

Figure 6B:
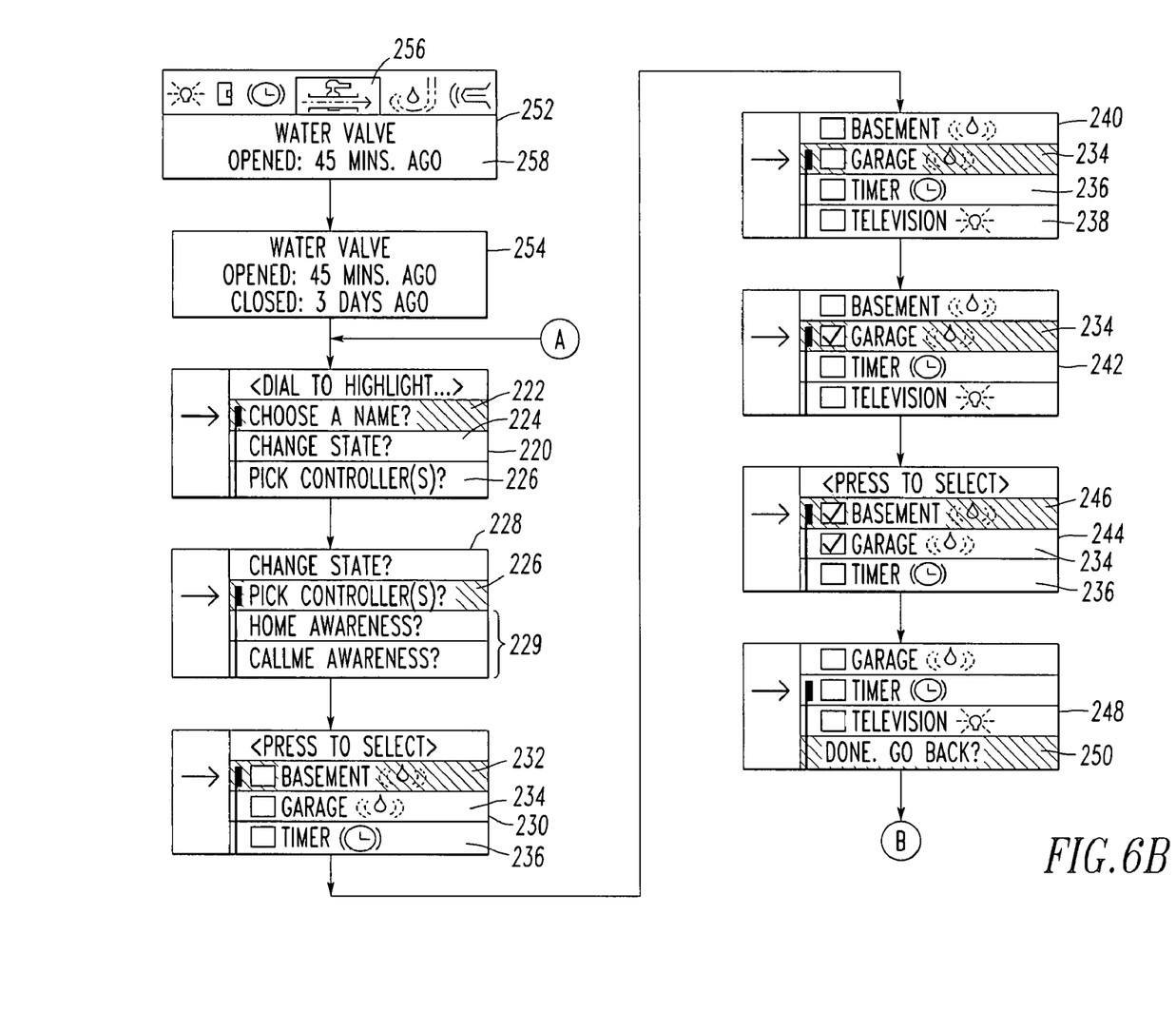

Next, the screens 214 and 216 prompt the user to "<dial to highlight . . . >" and "<press to select>" one of the three displayed actions: "Customize device?", "Done/Exit Training?" And "Remove Device?". If the user highlights and selects the "Remove Device?" option at screen 218, and regardless whether the device 207 was previously added, that information for such device is transferred to the base station 4, in order to remove the device 207 from the system 2. If the user highlights and presses (e.g., employing the encoder 76 of FIG. 3) "Customize device?" 219 at screen 218, then screen 220 of FIG. 6B is displayed. Here, no information is sent to the base station 4 at that time.

The screen 220 of FIG. 6B prompts the user to "<dial to highlight . . . >" one of "Choose a name?" 222, "Change State?" 224, and "Pick controller(s)?" 226. If "Choose a name?" 222 is selected, then the next screen (not shown) lists the possible names of that device (e.g., Main Water Supply Shut Off Valve; Sprinkler System-Front Yard) for selection by the fob 6. If "Change State?" 224 is selected, then the next screen (not shown) lists the possible states of that device (e.g., open; closed) (see, for example, fob screen 370 of FIG. 9A after an alarm or alert condition) for manual control/override by the fob 6. For example, a main water valve is normally open and a water sensor alert is employed to close that valve. Alternatively, a water sprinkler valve is normally closed and a low moisture sensor alert is employed to open that valve. Preferably, a settable option (e.g., a default "critical control state," which is the state a device gets into when triggered by the selected controller(s)) is employed.

If, however, "Pick controller(s)?" 226 is selected, as shown in screen 228, then "<press to select>" and a list of sensors is presented in screen 230. In turn, the user may scroll through the list of sensor names 232,243,236,238, as shown in screens 230,240, of sensors, such as 8,10 of FIG. 1, which can set an alert for the particular device 207 of FIG. 6A.

In this example, the user selects the "Garage" sensor 234 of screen 240 by clicking on that object, as shown in screen 242, in order to add that sensor to the controller list of the particular device 207. In turn, the user may scroll down or up (as shown in screen 244) to select, for example, the "Basement" sensor name 232 at selection 246 of screen 244 by clicking on that object, in order to add that sensor to the controller list of the particular device 207. Finally, when all of the desired controllers have been selected, the user scrolls down to the bottom of the list as shown in screen 248 and selects "Done. Go back." 250. This returns the user to the screen 216 of FIG. 6A. At that point, if the user highlights and selects the "Done/Exit Training?" option 156, then the newly entered information for the device 207 is transferred to the base station 4.

In screen 228 of FIG. 6B, one, two or more device awareness levels may be set, such as through the fob 6. For example, a cellular telephone (not shown), a pager (not shown), or another handheld electronic device or system (not shown) may be chosen at selections 229. In addition, zero, one, two, three or more awareness levels may be employed for a particular device. For example, "Silent Awareness?" means that the audible buzzer 84 (FIG. 3) of the fob 6 is inactive regardless of the state of that device. Otherwise, the user can select that an audible alert as determined by the base station 4 be sounded if the configured device 207 is, for example, opened or if such device is, for example, closed.

FIG. 6B shows two additional screens 252,254 that are employed for monitoring the sensors 8,10 and the device 12. For example, if the icon 256 of the Water Valve is selected in screen 252, then the name of the device (e.g., Water Valve) and the state (e.g., Opened) and the time of the last state change (e.g., 45 minutes ago) is displayed at display portion 258.

If the button 77 (FIG. 3) of the fob 6 is depressed, then additional information, such as the previous device state (e.g., Closed) and the time of the previous state change (e.g., 3 days ago) for the device 12, is also shown in the screen 254.

In turn, if the fob button 77 is held for a suitable time (e.g., without limitation, greater than four seconds), then the screen 220 of FIG. 6B is displayed. For example, the training menus of FIGS. 6A–6B are accessed by holding the fob button 77 down for the suitable time or by sliding the fob 6 into the training channel (not shown) on the device 12.

For example, double-clicking may be employed for manual control. For example, if the user double-clicked on the valve icon (e.g., 378 or 380 of FIG. 9B), then the user is asked, similar to the screen 370 of FIG. 9A, whether the user wishes to close the valve (or whatever the opposite state was from the state it was currently in) and then allows the user to do it.

The above actions are possible when the fob 6 is within range of the base station 4 of FIG. 1. For example, training and double-click control are not available to the user when out of range. In that case, for example, a full screen message (not shown) is displayed on the fob 6 noting "Cannot train device now, must be within range of base to train".

Figure 7A:
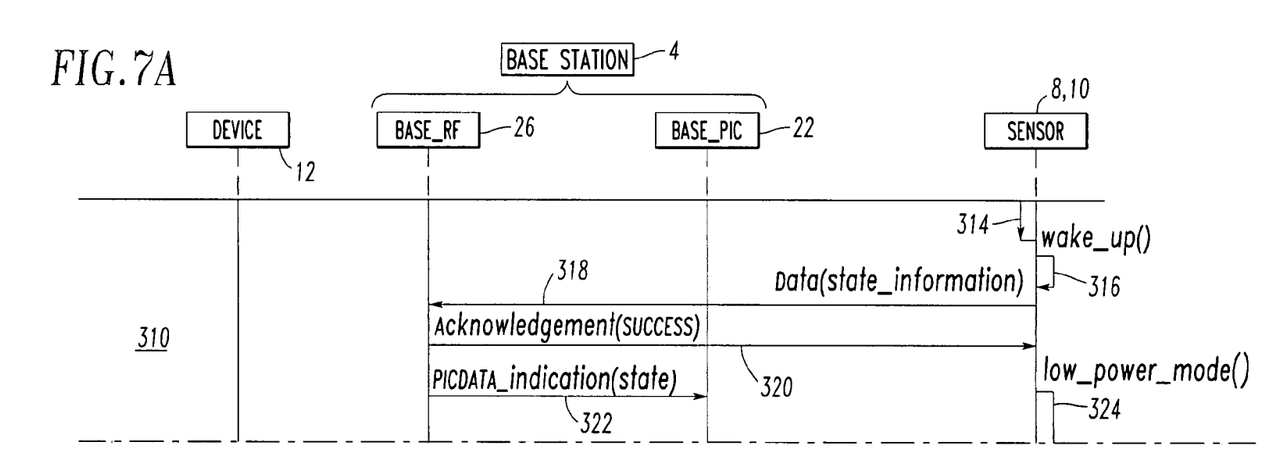
FIGS. 7A–7B are message flow diagrams showing the interaction between one of the sensors, the base station and the control device of FIG. 1 for automatically controlling that device.
Figure 7B:
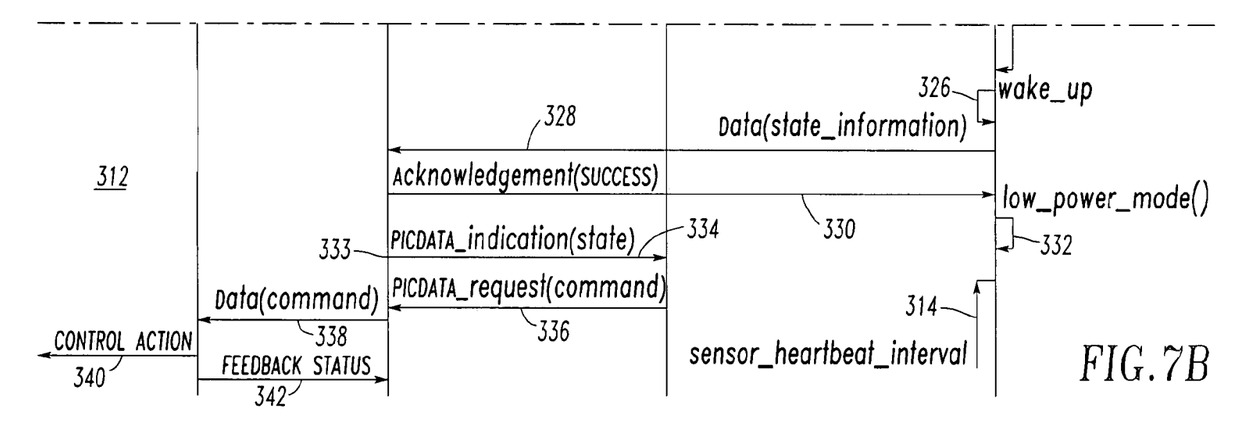

FIGS. 7A and 7B are message flow diagrams 310,312 showing various messages among one of the sensors 8,10, the base station 4 and the device 12 of FIG. 1 for monitoring that sensor and controlling that device. FIG. 7A shows that the sensor sends state information to the base station 4 at regular (e.g., periodic) intervals. FIG. 7B shows that the sensor also sends state information to the base station 4 in response to sensor state changes. The sensor timer 98 of FIG. 5 preferably establishes the regular interval, sensor_heartbeat_interval 314 of FIGS. 7A–7B (e.g., without limitation, once per minute; once per hour; once per day; any suitable time period), for that particular sensor, such as 8,10. It will be appreciated that the regular intervals for the various sensors 8,10 may be the same or may be different depending upon the desired update interval for each particular sensor.

In FIG. 7A, after the expiration of the sensor_heartbeat_interval 314, the sensor, such as 10, wakes up (wake_up( )) at 316. Next, the sensor 10 sends a Data(state_information) RF message 318 to the base station RF processor 26, and that RF processor 26 responsively sends an Acknowledgement (SUCCESS) RF message 320 back to the sensor 10. Responsive to receiving that message 320, the sensor 10 enters a low_power_mode( ) 324 (e.g., in order to conserve power of the sensor battery 90 of FIG. 5). Also, responsive to sending that message 320, the base station RF processor 26 sends a PICDATA_indication(state) message 322 to the base station PIC processor 22. Both of the Data(state_information) RF message 318 and the PICDATA_indication(state) message 322 convey the state of the sensor 10 (e.g., sensor on/off or water detected/not detected; sensor battery OK/low).

The low_power_mode( ) 324 is maintained until one of two events occurs. As was previously discussed, after the expiration of the sensor_heartbeat_interval 314, the sensor 10 wakes up at 316. Alternatively, as shown in FIG. 7B, the sensor 10 wakes up (wake_up( ) 326) in response to a state change (e.g., the sensor 10 detects water (or no water) responsive to the analog input 110 of FIG. 5). Next, the sensor 10 sends a Data(state_information) RF message 328 to the base station RF processor 26, and that RF processor 26 responsively sends an Acknowledgement(SUCCESS) RF message 330 back to the sensor 10. Responsive to receiving that message 330, the sensor 10 enters a low_power_mode( ) 332. After the expiration of the sensor_heartbeat_interval 314, the sensor 10 wakes up at 316 of FIG. 7A. Next, at step 333, the base station RF processor 26 responsively sends a PICDATA_indication(state) message 334 to the base station PIC processor 22. Both of the Data(state_information) RF message 328 and the PICDATA_indication(state) message 334 convey the state of the sensor 10. Responsive to receiving that message 334, the base station PIC processor 22 sends a PICDATA_request(command) message 336 to the base station RF processor 26. Such a command is sent, in this example, when the sensor state change corresponds to an alert condition (e.g., water detected). Finally, the base station RF processor 26 sends a Data(command) RF message 338 to the device 12. In response, that device 12 undertakes a corresponding control action 340 (e.g., close valve) and sends back feedback status 342 to the base station RF processor 26. The response by that processor 26 and the subsequent activity by the fob 6 are discussed, below, in connection with FIG. 8, which shows the procedure and messages for monitoring and manual control at the fob 6.

It will be appreciated that if, for example, the user had selected multiple sensors, such as 8 and 10, including for example, the "Garage" water sensor 234 and the "Basement" water sensor 232 of FIG. 6B, that the Data(state_information) RF message 328 including the "water detected" state from either or both of such sensors 234,232 would result in the Data(command) RF message 338 to the device 12. This is an example of OR logic as is discussed, below, in connection with Examples 4, 5 and 8.

Alternatively, if, for example, the user had selected AND logic, as is discussed, below, in connection with Examples 5, 6, 9, 10, 11, 12 and 13, along with multiple sensors, such as 8 and 10, including, for example, the "Garage" water sensor 234 and the "Basement" water sensor 232 of FIG. 6B, then the Data(state_information) RF message 328 including the "water detected" state from both of such sensors 234,232 would result in the Data(command) RF message 338 to the device 12.

Figure 8:
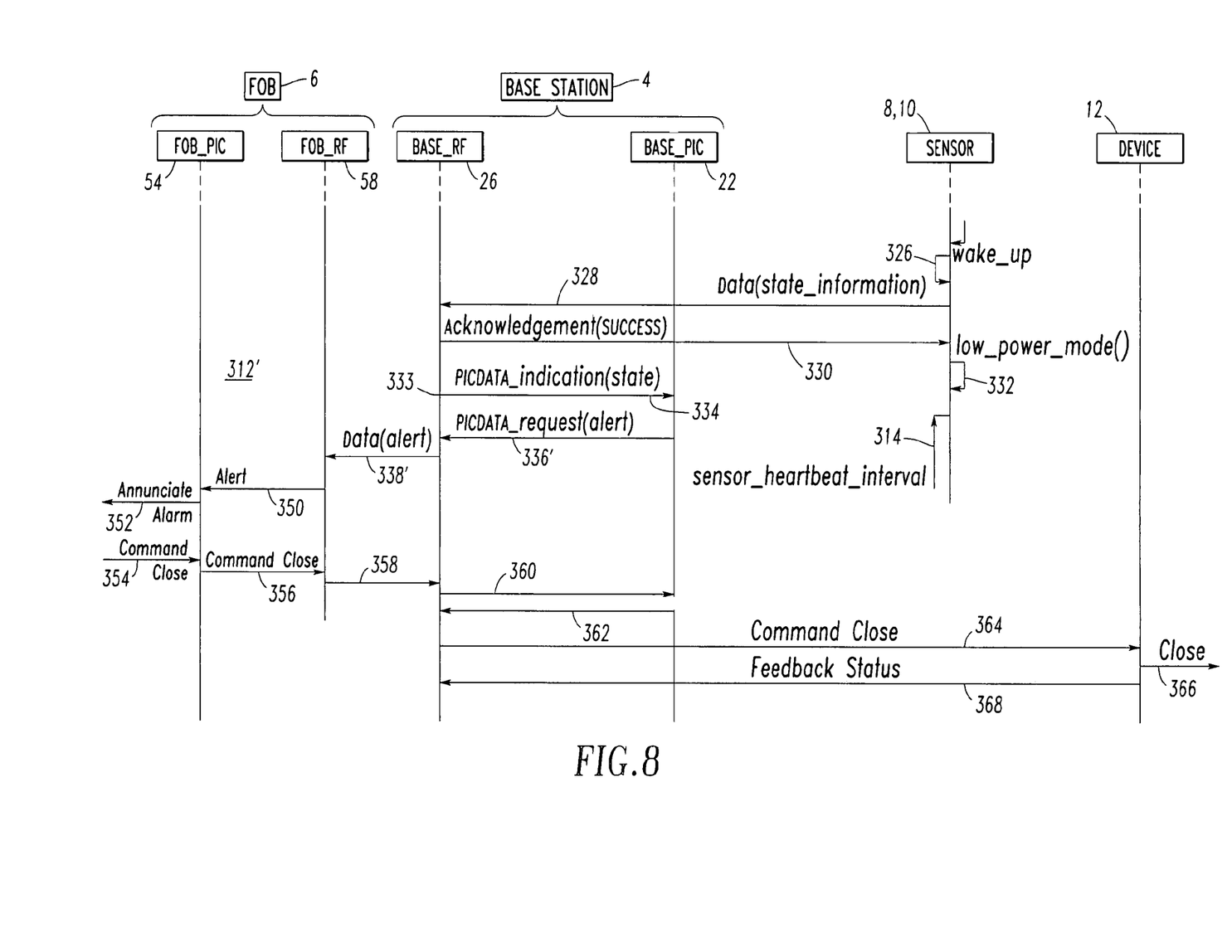
FIG. 8 is a message flow diagram showing the interaction between one of the sensors, the base station and the control device of FIG. 1 for automatically controlling that device.

FIG. 8 is a message flow diagram 312', which is somewhat similar to the message flow diagram 312 of FIG. 7B, showing various messages among one of the sensors 8,10, the base station 4, the fob 6 and the device 12 of FIG. 1 for monitoring that sensor and controlling that device. In this example, the device 12 was initially trained by the fob 6 to be controlled by one or more of the sensors AND by manual control by the fob 6. As a result, responsive to receiving the message 334, the base station PIC processor 22 sends a PICDATA_request(alert) message 336', rather than the PICDATA_request(command) message 336 of FIG. 7B, to the base station RF processor 26. Such an alert is sent, in this example, when the sensor state change corresponds to an alert condition (e.g., water detected). Next, the base station RF processor 26 sends a Data(alert) RF message 338' to the fob_RF processor 58, which communicates an alert message 350 to the fob_PIC processor 54.

Next, the fob 6 suitably annunciates the alert at step 352. In response to that alert, the user inputs a suitable command, at 354, to close the device 12. Then, the fob_PIC processor 54 communicates a command close message 356 to the fob_RF processor 58. Next, the fob_RF processor 58 sends a command close RF message 358 to the base_RF processor 26. Then, the base_RF processor 26 sends a command close message 360 to the base_PIC processor 22, which acknowledges that message at step 362. Next, the base_RF processor 26 sends a command close RF message 364 to the device 12. The device 12, at step 366, undertakes a corresponding control action (e.g., to close the water valve). Finally, the device 12 sends a feedback status RF message 368 to the base_RF processor 26. The response of the base_RF processor 26 to that RF message 368 may be similar to it sending the Data(alert) message 338', except that the previous message 338' dealt with the sensor 8,10 detecting water, while the subsequent response of the base_RF processor 26 deals with the device 12 being shut off or closed. In turn, the user may employ the display 78 (FIG. 3) of the fob 6 to show, for example, a screen, such as 252 of FIG. 6B, which displays the Water Valve being opened, in this example, one or more seconds ago.

EXAMPLE 1

Figure 9A:
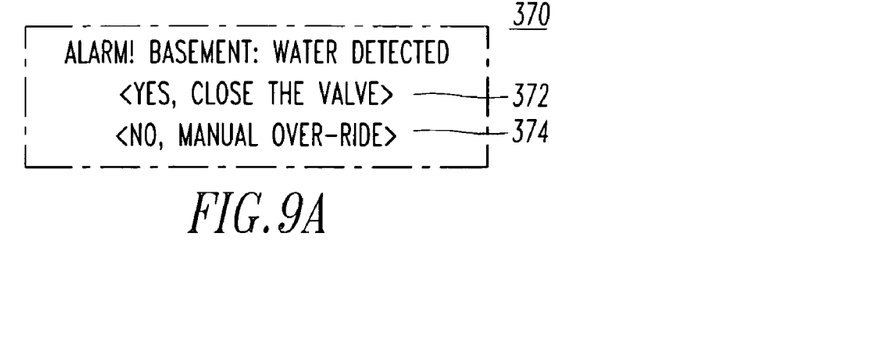
FIG. 9A is an example of a display screen used by the fob for monitoring and manually controlling the control device of FIG. 1.

In the example of FIG. 8, the user at the fob 6 may be asked to confirm that the device 12 (e.g., a water valve) should close. In that example, the fob 6 displays a screen that includes information, such as, for example:

"Alarm! name of sensor(s), alarm, state, close valve? As a more specific example, FIG. 9A shows the fob screen 370. In this more specific example, the <yes . . . > selection 372 would confirm that the system should close the device 12, while the <no . . . > selection 374 would maintain the current device state (e.g., valve open) and allow the user to later remotely close the device 12 through the fob 6 (e.g., Example 2, below) or manually close a valve at a physical water valve (not shown) associated with the device 12 after manually verifying, for example, the abnormal presence of water in, for example, the basement (not shown).

Also, the fob 6 may report if there are any pending alerts. If so, the fob 6 informs the user that one or more sensors 10,12 are still sending alert triggers and that those will be ignored until the next time that they are generated (e.g., a water sensor currently reporting water would need to report no water and, then, later report water again).

EXAMPLE 2

Alternatively, a suitable icon, such as 256 of FIG. 6B, may be employed and the user may, for example, double click on that icon to change the state of the device 12.

EXAMPLE 3

Figure 9B:
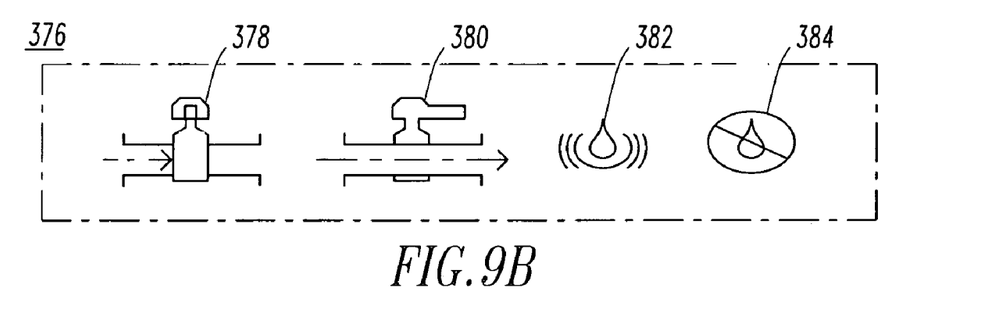
FIG. 9B is an example of a portion of a display screen used by the fob for monitoring the sensors and the control devices of FIG. 1.

FIG. 9B shows a portion of a fob screen 376 including example icons 378,380,382,384 for two devices and two sensors. The icon 378 shows that the corresponding device (not shown) is a closed water valve, while the icon 380 shows that the corresponding device (not shown) is an open water valve. The icon 382 shows that the corresponding sensor (not shown) has detected water, while the icon 384 shows that the corresponding sensor (not shown) has not detected water.

EXAMPLE 4

As was discussed above in connection with FIG. 6B, that example configuration procedure is for OR logic. The device 12 (e.g., a water valve) in this example is configured to respond to one or both of the water sensor in the Garage OR the water sensor in the Basement. In this example, for the automatic water shut-off valve example of FIGS. 7A–7B, all association is done on the device 12 and not with the sensors 8,10 or any other controller device(s) (not shown). Here, the list of possible "controllers" or triggers from the various sensors 8,10 is generated at the time of training the device 12 based on the current list of sensors that have been set to "alert" on some state as was discussed, above, in connection with FIG. 6B.

Here, in this example, the controlling "action" of turning off the device 12 (e.g., valve closed) is done automatically. The "resetting" of the device 12 out of its control action (e.g., from valve closed to valve open) is done, for example, by double clicking on the device's icon, such as 256 of FIG. 6B, on the fob 6.

EXAMPLE 5

Figure 9C:
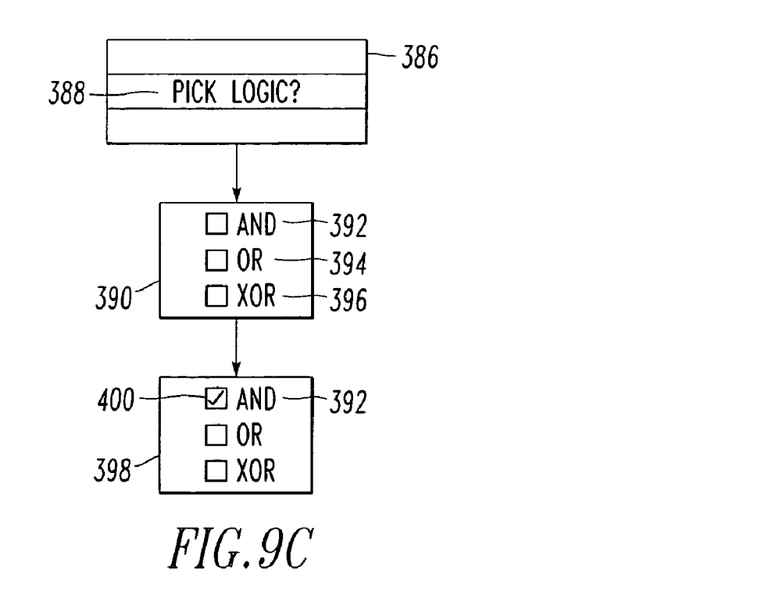
FIG. 9C is an example of a display sequence used by the fob for configuring the control device of FIG. 1.

FIG. 9C shows a sequence of display screens employed for logic selection. These screens may be part of, for example, the device training sequence of FIG. 6B. At screen 386, the user is invited to select "Pick Logic?" 388. If that item is selected, then screen 390 invites the user to select one of AND logic 392, OR logic 394 and XOR logic 396. If AND logic 392 is, then, selected in screen 398, as shown with the check 400, then AND logic is applied to the selected sensors of FIG. 6B instead of OR logic, as was discussed, above.

EXAMPLE 6

As a more particular example for Example 5, a Water Valve device, in this example, is configured to respond to both of a first Water Sensor AND a second Water Sensor. Here, both the first Water Sensor AND the second Water Sensor need to both detect water before the Water Valve device is commanded to close.

EXAMPLE 7

Alternatively, a Temperature Sensor (not shown) may be employed in the logic, for example, to turn off an outside water valve device (not shown) when the temperature is about 32° (e.g., automatically prevent pipes (not shown) from freezing).

EXAMPLE 8

As another alternative to FIG. 6B for OR logic, a Water Valve device, in this example, is configured to respond to one or both of a Water Sensor in the Basement (not shown) OR a Pushbutton Sensor (not shown) in the Basement. In this example, the Pushbutton Sensor detects and reports when, for example, a manual pushbutton (not shown) is depressed by a user.

EXAMPLE 9

As another alternative to FIG. 9C for AND logic, a Water valve device, in this example, is configured to respond to both of a water sensor in the Basement (not shown) detecting water AND a Pushbutton sensor (not shown) in the Basement being depressed.

EXAMPLE 10

As alternatives to the example OR logic (FIG. 6B) and AND logic (FIG. 9C), a wide range of suitable logic function(s) may be employed. For example, one, some or all of the following example logic functions may be employed: AND, OR, XOR, INVERT, DELAY (e.g., set an output after an input is true plus a predetermined delay time), PERIOD OF TIME (e.g., set an output if an input is true for a period of time), or TIMER (e.g., another sensor with an alert state, such as, for example, set to alarm in two weeks and configured to tell the critical control device (e.g., the water valve) to close (or open) on the timer alert).

EXAMPLE 11

As another example, a water valve device, such as 12, may control an outside sprinkler system (e.g., for the front yard) and a water sensor, such as 8,10, may determine if the outside (e.g., front yard) is dry (i.e., relatively no water). Hence, if the water sensor determines that the front yard ground is dry, AND if confirmed by the fob 6, then the front yard sprinkler system may be turned on.

EXAMPLE 12

As another example, if a first living room motion sensor (not shown) AND a second living room motion sensor (not shown) both detect motion, then a device, such as 12, may turn the living room light on.

EXAMPLE 13

As another example, if a coffee pot (not shown) is left on for greater than 60 minutes, as determined by a sensor AND by a PERIOD OF TIME, then set a NC relay device (not shown) to open (and, thus, turn off the coffee pot).

EXAMPLE 14

As another example, if a first light switch sensor (not shown) XOR a second light switch sensor (not shown), then turn a hall light device (not shown) on.

EXAMPLE 15

Non-limiting examples of devices (i.e., output nodes), such as 12, include water valves (shut off; turn on), gas valves (shut off; turn on), electrical switches (power shut off; power turn on), generator (shut off; turn on), garage door (open; close), deadbolt lock (lock; unlock), thermostat (set setpoint), appliance electrical switches (appliance power shut off; appliance power turn on), light switches (shut off lights; turn on lights), communication "firewall" control (enable or secure; disable or insecure), relay device (normally open contact; normally close contact), X10 gateway (enable; disable), camera trigger (trigger snapshot), and water sprinkler (turn on; turn off).

EXAMPLE 16

When a sensor (input node) (e.g., water sensor), such as 8,10, joins the wireless network 20 of FIG. 1, the user is prompted by the fob 6 to: (1) select a name for the sensor (e.g., washer; water heater; basement); (2) indicate what event or state change will trigger an alert by the base station 4 (e.g., water present; water absent); and (3) the form of alert (e.g., display message on fob 6; audible tone on fob 6; vibration on fob 6; remote telephone call (e.g., through link 14 of FIG. 1); remote e-mail message (e.g., through link 14 of FIG. 1)).

EXAMPLE 17

When a device (output node) (e.g., water valve), such as 12, joins the wireless network 20, the user is prompted by the fob 6 to: (1) select a name for the device (e.g., main water shut off valve; water heater valve); (2) select which of the sensors (or other nodes, such as, for example, fob; pager; cellular telephone; PDA; wireless handheld device), such as 8,10, can control it; and (3) configure the logic (e.g., OR; AND; XOR) to be used for multiple sensor or fob inputs. For example, the first time that any device is added to the system 2 of FIG. 1, the user is automatically taken through the training menus of FIGS. 6A–6B, in order to confirm the device name, define the critical control state of the device, select the controller(s), and select the alert method.

EXAMPLE 18

An "output" device (e.g., without limitation, a water valve) may have one or more sensing elements as well as one or more control elements and, as such, may be "self controlling." If so, then the sensing element(s) of the device will show up in the list of controllers (e.g., as shown in FIG. 6B) just like any other sensor.

While for clarity of disclosure reference has been made herein to the exemplary display 78 of FIG. 3 for displaying sensor or device or network information, it will be appreciated that such information may be stored, printed on hard copy, be computer modified, or be combined with other data. All such processing shall be deemed to fall within the terms "display" or "displaying" as employed herein.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A system for a structure, said system for a structure comprising:
   a server including a first wireless communication port and a user interface;
   at least one sensor, each of said at least one sensor sensing information and including a second wireless communication port, which sends said sensed information to the first wireless communication port of said server; and
   at least one device, each of said at least one device outputting a control action and including a third wireless communication port, which receives said control action from the first wireless communication port of said server,
   wherein the user interface of said server is adapted to configure said at least one device to output said control action responsive to: (a) at least one input from said at least one sensor, (b) another input from one of said at least one sensor or said user interface, and (c) a logic function applied to said at least one input from said at least one sensor and to said another input from one of said at least one sensor or said user interface, and
   wherein the user interface of said server is further adapted to display a first selection to confirm that the system should change the control action of one of said at least one control device, and a second selection to confirm that the system should not change the control action of said one of said at least one control device.

2. The system for a structure of claim 1 wherein said logic function is a predetermined logic function.

3. The system for a structure of claim 2 wherein said predetermined logic function is not user configurable through said user interface.

4. The system for a structure of claim 2 wherein said predetermined logic function is an OR logic function.

5. The system for a structure of claim 2 wherein said predetermined logic function is user configurable through said user interface.

6. The system for a structure of claim 5 wherein said predetermined logic function is selected from the group consisting of an OR logic function, an AND logic function, and an XOR logic function.

7. The system for a structure of claim 1 wherein said at least one sensor includes a plurality of sensors; wherein said at least one input is a plurality of inputs from at least some of said sensors; and wherein the user interface of said server is adapted to configure said at least one device to output said control action responsive to said plurality of inputs from at least some of said sensors.

8. The system for a structure of claim 7 wherein said logic function is an OR logic function.

9. The system for a structure of claim 7 wherein said logic function is an AND logic function.

10. The system for a structure of claim 1 wherein said at least one sensor includes a plurality of sensors; wherein said at least one input is a plurality of inputs from at least some of said sensors; and wherein the user interface of said server is adapted to configure said at least one device to output said control action responsive to said plurality of inputs from at least some of said sensors and said another input from said user interface.

11. The system for a structure of claim 10 wherein said logic function is an OR logic function.

12. The system for a structure of claim 10 wherein said logic function is an AND logic function.

13. The system for a structure of claim 10 wherein said at least one device is one output device; and wherein said user interface displays at least one of a name of said one output device, an output state of said one output device, a selection for said server to control said one output device.

14. The system for a structure of claim 1 wherein said at least one sensor is a water sensor; and wherein said at least one device is a water valve.

15. The system for a structure of claim 14 wherein said control action is to close said water valve.

16. The system for a structure of claim 15 wherein said control action is to open said water valve.

17. The system for a structure of claim 1 wherein said server is adapted to communicate with one of a telephone line, a cellular telephone, a global communication network, a local area network, and a pager as another user interface.

18. The system for a structure of claim 1 wherein said server is a network coordinator for said at least one sensor and said at least one device.

19. The system for a structure of claim 1 wherein said server, said at least one sensor and said at least one device form an IEEE 802.11 wireless local area network.

20. The system for a structure of claim 1 wherein said server, said at least one sensor and said at least one device form an IEEE 802.15.4 wireless personal area network.

21. A method of configuring a system for a structure for a control action, said method comprising:
    sensing information by at least one sensor;
    wirelessly sending said sensed information from said at least one sensor to a node;
    determining a control action at said node;
    outputting said control action;
    configuring said control action to be responsive to: (a) at least one input from said at least one sensor, (b) another input from one of said at least one sensor or a user interface, and (c) a logic function applied to said at least one input from said at least one sensor, and to said another input from one of said at least one sensor or said user interface; and
    displaying a first selection to confirm that the system should change said control action, and a second selection to confirm that the system should not change said control action.

22. The method of claim 21 further comprising:
    employing as said node a server including said user interface;
    determining said control action at said server;
    wirelessly sending said control action from said server to at least one device; and
    outputting said control action from said at least one device.

23. The method of claim 21 further comprising
    employing as said at least one sensor a plurality of sensors;
    wirelessly inputting a plurality of inputs from at least some of said sensors; and
    employing the user interface of said server to configure said at least one device to output said control action responsive to said plurality of inputs from at least some of said sensors.

24. The method of claim 21 further comprising employing as said at least one sensor a plurality of sensors;
wirelessly inputting a plurality of inputs from at least some of said sensors; and
employing the user interface of said server to configure said at least one device to output said control action responsive to said plurality of inputs from at least some of said sensors and from another input from said user interface.

25. The method of claim 21 further comprising employing the user interface of said server to pre-configure said logic function from the group consisting of an OR logic function, an AND logic function, and an XOR logic function.

26. The method of claim 21 further comprising closing a valve as said change said control action; and
maintaining the valve open as said not change said control action.

* * * * *